United States Patent [19]

Konopka et al.

[11] 3,725,543

[45] Apr. 3, 1973

[54] SYNERGISTIC ANTIBIOTICS

[75] Inventors: Edward Alexander Konopka, Murray Hill, N.J.; Justus Melchior Gelzer, Riehen, Switzerland

[73] Assignee: Ciba-Geigy Corporation, Ardsley, N.Y.

[22] Filed: Dec. 8, 1971

[21] Appl. No.: 206,185

Related U.S. Application Data

[63] Continuation-in-part of Ser. No. 81,112, Oct. 20, 1970, which is a continuation-in-part of Ser. No. 13,788, Feb. 24, 1970, abandoned, which is a continuation-in-part of Ser. No. 809,967, March 24, 1969, Pat. No. 3,644,616.

[52] U.S. Cl. .................................................. 424/114
[51] Int. Cl. ............................................. A61k 21/00

[58] Field of Search ........................................ 424/114

[56] References Cited

OTHER PUBLICATIONS

R. Virchow et al., Dtsch. Med. Wscar. 92Jq., 1967, pages 2217–2220

Primary Examiner—Jerome D. Goldberg
Attorney—Joseph G. Kolodny et al.

[57] ABSTRACT

Rifamycines or their semisynthetic derivatives, in combination with other antibiotics selected from oligosaccharides, tetracyclines, amphenicols, macrolides or peptides exhibit synergistic effects against pathogens.

6 Claims, No Drawings

SYNERGISTIC ANTIBIOTICS

CROSS-REFERENCES TO RELATED APPLICATIONS

This is a continuation-in-part of application, Ser. No. 81,112, filed Oct. 15, 1970, which in turn is a continuation-in-part of application Ser. No. 13,788, filed Feb. 24, 1970 (now abandoned), which in turn is a continuation-in-part of application, Ser. No. 809,967, filed Mar. 24, 1969 now U.S. Pat. No. 3,644,616.

SUMMARY OF THE INVENTION

The present invention concerns and has for its object the provision of new pharmaceutical or veterinary compositions, feedstuffs or feed additives comprising synergistic combinations of 1) rifamycines or their semisynthetic derivatives, with 2) antibiotics selected from oligosaccharides, tetracyclines, amphenicols, macrolides or peptides, as well as of methods for the preparation and application of these products, which are useful antibacterial agents or growth promoters.

DESCRIPTION OF THE PREFERRED EMBODIMENTS

The rifamycines of the new compositions and feed preparations are known and represent especially the rifamycines B, SV, S, O, AG or X, preferably their semisynthetic derivatives, e.g. rifamide, rifazine or advantageously rifampicin. Said component is described, inter alia, in Il Farmaco, Ed. Sci. 16, 755 and 766 (1961), 21, 68 (1966) and 22, 307 (1967); J. Med. Chem. 7, 596 (1964), 8 790 (1965) and 11, 936 (1968); Antimicrobial Agents and Chemotherapy (Am. Soc. Microbiol.) 1965, p. 765 or 1967, p. 699, the Report of the 5th Internatl. Congr. of Chemotherapy, 1967; French Pat. Nos. 1,434,532, 1,457,435 and 5518M, Belgian Patent Nos. 654,209 and 685,886, South African Patent 68/0903 and U.S. Pat. No. 3,349,082.

The antibiotics used are also known and are represented by the group of natural or semisynthetic a) saccharides, such as streptomycin A or B or oxystreptomycin, or their semisynthetic derivatives, e.g. dihydrostreptomycin or -oxystreptomycin, or preferably the higher saccharides, especially the trisaccharides, e.g. kanamycin (A, B or C), glebomycin or gentamycin; also the tetrasaccharides, e.g. neomycin or paromycin, b) tetracyclines, e.g. tetracycline, chlortetracylcine, demethylchlortetracycline, doxy-cycline, lymecylcine, meclocycline, methacycline, minocycline, nitrocycline, oxytetracycline, rolitetracycline or sancycline, c) amphenicols, e.g. chloramphenicol, azidoamphenicol, thiamphenicol or fluophenicol, d) macrolides, e.g. carbomycin (A or B), erythromycin, oleandomycin, pikromycin, spiramycin or troleandomycin, or e) piptides, e.g. amphomycin, bacitracin, colistin, gramicidin, lincomycin, novobiocin, polymixin, ristocetin, tyrocidin (A, B or C), vancomycin or viomycin, which are described, inter alia, in Erhart-Ruschig, Arzneimittel II, 1571 et seq. (Verlag Chemie, Weinheim 1968). Said book also describes the rifamycines on page 1517 et seq.

The compositions and feed preparations according to the invention contain an effective amount of the rifamycines and other antibiotics in a ratio between about 1:10 and 10:1, preferably between about 1:5 and 5:1, especially between about 1:2 and 2:1, and the usual amount of conventional excipients or extenders, whereby the total amount of both antibiotics can be less than that used in the known preparations of the components.

The antibacterial effects of the new combinations can be demonstrated either *in vitro* or *in vivo* tests. For example, the growth dynamics of Gram-negative or positive bacteria can be estimated in media which contain, besides the nutrients, a. no antibiotic (control $\phi$).
b. the rifamycines (A) or other antibiotics (B) alone,
c. both components (A + B).

The single amounts of A and B used according to c) can be half of those used according to b). *In vivo* tests are performed with various test animals, advantageously with mammals, such as mice, which are challenged intravenously or intraperitoneally with a lethal or sublethal amount of pathogens, whereupon the compositions of the invention are administered either enterally or parenterally, e.g. orally or subcutaneously. Their effect can either be determined by the curing (or survival) rate of infected animals or by the recovery of viable pathogens from their organism, for example, from particular organs, such as kidneys.

Surprisingly, it has been found that the growth dynamics of pathogens, more particularly of the antibiotically less tractable Gram-negative bacteria, such as the Aerobacter, Brucella, Escherichia, Klebsiella, Malleomyces, Neisseria, Pasteurella, Proteus, Pseudomonas, Salmonella, Shigella and Vibrio strains, as well as those of Gram-positive bacteria, such as Actinomyces, Clostridia, Corynebacteria, Diplococci, Mycobacteria, Staphylococci or Streptococci, are beneficially altered by the compositions of the invention. For example, said *in vitro* growth dynamics according to items a), b) and c) can be depicted as follows:

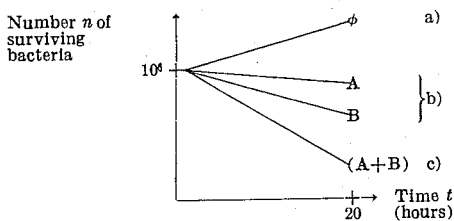

These functions $f(n,t)$ depicting said growth dynamics indicate that the antibacterial effect of a combination according to the invention is bigger than that obtainable with the same amount of the components.

Accordingly, the new compositions and feed preparations are superior to those of the presently used components, since lesser doses can be applied. Moreover, a suppression of resistance development can be achieved. For example, pathogens attacked with the rifamycines or their semisynthetic derivatives, seem to be more sensitive to the other antibiotics mentioned above under item 2), especially penicillines, cephalosporines, streptomycines, kanamycines or gentamycines.

Particularly useful are pharmaceutical or veterinary compositions, as well as feedstuffs and feed additives, comprising an effective amount of 1. a rifamycin selected from the group consisting of rifamycin (AG, B, O, S, SV or X), rifamide, rifampicin and rifazine or a therapeutically useful salt thereof and
2. another antibiotic selected from the group consisting of kanamycin (A, B or C), glebomycin or gentamycin; neomycin or paromycin; tetracycline, chlortetracycline, demethylchlortetracycline, doxycycline, lymecylcine, meclocycline, methacycline, minocycline, nitrocycline, oxytetracycline, rolitetracycline or sancycline; chloramphenicol, azidoamphenicol, thiamphenicol or fluophenicol; carbomycin (A or B), erythromycin, oleandomycin, pikromycin, spiramycin or troleandomycin; amphomycin, bacitracin, colistin, gramicidin, lincomycin, novobiocin, polymixin, ristocetin, tyrocidin (A, B or C), vancomycin or viomycin; or a therapeutically useful salt thereof.

Especially valuable are compositions and feed preparations containing a pharmacologically effective amount of
1. rifamycin SV, rifamide, rifampicin or rifazine, or a therapeutically useful salt thereof and
2. kanamycin, gentamycin or neomycin; tetracycline, chlortetracycline, demethylchlortetracycline, doxycycline, methacycline, oxytetracycline or rolitetracycline; chloramphenicol; erythromycin, oleandomycin or troleandomycin; bacitracin, colistin, gramicidin, novobiocin, polymixin or vancomycin; or a therapeutically useful salt thereof.

Outstanding are compositions containing an antibiotically effective amount of
1. rifampicin or a therapeutically useful salt thereof and
2. either a) kanamycin, gentamycin or neomycin, or b) tetracycline, chlortetracycline or oxytetracycline, or c) chloramphenicol or d) colistin; or a therapeutically useful salt thereof.

Said compositions and feed preparations advantageously contain but one of the above antibiotics mentioned under items 1) and 2) but can contain more than one of each, for example, more than one of the antibiotics listed under item 2). The preferred proportions of the active ingredients of said compositions and feed preparations range between about 1:5 and 5:1, advantageously between about 1:2 and 2:1. In addition to the active ingredients, they contain the usual amount of conventional excipients or extenders.

The pharmaceutical or veterinary compositions according to the invention contain both of said antibiotics mentioned under 1) and 2) in about the same or a lesser amount than that used in conventional compositions of the components, in conjunction or admixture with excipients suitable for either enteral, parenteral or topical application. Preferred are tablets and gelatin capsules comprising the active ingredients together with a) diluents, e.g. lactose, dextrose, sucrose, mannitol, sorbitol, cellulose and/or glycine, b) lubricants, e.g. silica, talcum, stearic acid, its magnesium or calcium salt and/or polyethyleneglycol, for tablets also c) binders, e.g. magnesium aluminum silicate, starch paste, gelatin, tragacanth, methylcellulose, sodium carboxymethylcellulose and/or polyvinylpyrrolidone, if desired, d) disintegrants, e.g. starches, agar, alginic acid or its sodium salt, enzymes of the binders or effervescent mixtures and/or e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75 percent, preferably about 1 to 50 percent of the active ingredients listed under 1) and 2).

The feedstuffs or additives for feed or drinking water contain both of said antibiotics also in about the same or a lesser amount as that used in conventional feedstuffs or additives of the components, which are intended to promote the growth and feed efficiency of domestic animals. Said feedstuffs or additives also contain the conventional extenders, diluents and/or nutrients, such as sucrose, glucose, molasses, fermentation residues, corn meal, ground and rolled oats, wheat shorts and middlings, meat scrap, oil cake, soybean and fish meal, alfalfa, clover or grass clippings and the like, mineral supplements, such as bone meal, calcium carbonate, iodized salt and the like, vitamins, such as vitamins A, B, C and D, and other suitable substances, such as preservants, e.g. benzoic acid. The feedstuffs contain the active ingredients advantageously in the dosage range, for example, between about 0.00001 and 0.01 percent, whereas the additives may consist of the pure substances, when used, for example, for the drinking water, but usually contain between about 1 and 75 percent thereof.

The following examples illustrate the invention and are not to be construed as being limitations thereon. Temperatures are given in degrees Centigrade and all parts wherever given are parts by weight.

EXAMPLE 1

Conventional test tubes are filled with 10 ml of conventional trypticase broth a) alone, or such containing b) rifampicin or the other antibiotics, or c) the combinations thereof, in a concentration between about 5–20 $\mu$g/ml.

Hereupon 0.1 ml of a freshly grown and standardized stock culture of *Escherichia coli* is added to said 10 ml broth, so that it contains approximately $10^6$ organisms per ml. After 20 hours incubation at 37°, 1 ml samples are removed and the number of viable cells therein determined according to the plate dilution method. It provides from a number of bacterial cells in a properly diluted specimen an equal number of visible colonies, which can be counted.

The following results are obtained:

| Antibiotic | Concentration $\mu$g/ml | No. of Cells After 0 and | 20 hours |
|---|---|---|---|
| none | 0 | $1.7.10^6$ | $1.7.10^9$ |
| rifampicin (A) | 5 | $1.7.10^6$ | $1.0.10^9$ |
| streptomycin (B) | 10 | $1.6.10^6$ | $1.0.10^9$ |
| A + B | 5 + 10 | $1.8.10^6$ | $6.8.10^2$ |

EXAMPLE 2

According to the method described in Example 1, the following results are obtained with *Proteus mirabilis*:

| Antibiotic | Concentration µg/ml | No. of Cells After 0 and | 20 hours |
|---|---|---|---|
| none | 0 | $1.8 \cdot 10^6$ | $1.8 \cdot 10^9$ |
| rifampicin (A) | 5 | $2.4 \cdot 10^6$ | $1.2 \cdot 10^9$ |
| " | 10 | $2.8 \cdot 10^6$ | $7.8 \cdot 10^8$ |
| " | 20 | $2.1 \cdot 10^6$ | $1.0 \cdot 10^9$ |
| streptomycin (B) | 5 | $1.6 \cdot 10^6$ | $1.5 \cdot 10^9$ |
| " | 10 | $2.0 \cdot 10^6$ | $1.2 \cdot 10^9$ |
| " | 20 | $1.5 \cdot 10^6$ | $1.1 \cdot 10^9$ |
| A + B | 5 + 5 | $2.3 \cdot 10^6$ | $7.5 \cdot 10^1$ |
| " | 5 + 10 | $2.2 \cdot 10^6$ | $1.5 \cdot 10^1$ |
| " | 10 + 5 | $2.1 \cdot 10^6$ | $2.3 \cdot 10^2$ |
| " | 10 + 10 | $1.5 \cdot 10^6$ | $1.5 \cdot 10^2$ |

EXAMPLE 3

According to the method described in Example 1, the following results are obtained with rifampicin-resistant cells of *E. coli*:

| Antibiotic | Concentration mg/ml | No. of Cells After 0 and | 24 hours |
|---|---|---|---|
| none | 0 | $3.6 \cdot 10^6$ | $1.3 \cdot 10^9$ |
| rifampicin (A) | 20 | $3.3 \cdot 10^6$ | $1.2 \cdot 10^9$ |
| streptomycin (B) | 20 | $3.6 \cdot 10^6$ | $9.7 \cdot 10^8$ |
| A + B | 20 + 20 | $3.8 \cdot 10^6$ | $9.0 \cdot 10^5$ |

EXAMPLE 4

White laboratory mice are infected by the i.p. application of a sufficient amount of *Escherichia coli* pathogens suspended in saline, which cause death of 90–100 percent of untreated control animals within 48 hours. About 30–60 minutes after infection, groups of 10 mice each are treated with the antibiotics shown in the table below, either alone or in combination, which antibiotics are administered only once in the form of aqueous solutions or suspensions orally. Said *in vivo* experiments are terminated at the 10th to 14th day after infection and the survivors counted. Most of the experiments were carried out twice and the average value estimated.

The following results were obtained:

| Antibiotic | Dose in mg/kg | % Survivors |
|---|---|---|
| rifampicin (A) | 25 | 50 |
| tetracycline (B) | 25 | 50 |
| A + B | 25 + 25 | 100 |
| A | 25 | 50 |
| B | 10 | 0 |
| A + B | 25 + 10 | 85 |
| A | 10 | 0 |
| B | 25 | 50 |
| A + B | 10 + 25 | 75 |

EXAMPLE 5

Groups of 10 white laboratory mice are infected by the intraperitoneal application of a suspension containing $10^7$ cells of *Pseudomonas aeruginosa*. This infecting dose causes 90–100 percent mortality in the untreated controls within 48 hours.

Medication is applied only once within one hour following infection, by the subcutaneous administration of the antibiotics listed below. Aqueous solutions or suspensions of the individual and combined antibiotics are freshly prepared each day and are allowed to remain at room temperature for 1 hour prior to administration.

The mice tested are observed for 14 days following infection and the survivors counted. Several experiments are repeated and the average value estimated. The following results were obtained:

A = Rifampicin, B = Streptomycin, C = Gentamycin, D = Kanamycin, E = Neomycin, F = Oxytetracyclin, G = Chloramphenicol, H = sodium colistimethate.

| Antibiotic | Dose mg/kg | Percent Survivors |
|---|---|---|
| none | 0 | 0 |
| A | 20 | 0 |
| B | 20 | 30 |
| A + B | 20 + 20 | 90 |
| A | 20 | 0 |
| B | 10 | 20 |
| A + B | 20 + 10 | 80 |
| none | 0 | 10 |
| A | 20 | 10 |
| C | 5 | 10 |
| A + C | 20 + 5 | 100 |
| A | 20 | 10 |
| C | 2.5 | 10 |
| A + C | 20 + 2.5 | 90 |
| A | 10 | 0 |
| C | 5 | 10 |
| A + C | 10 + 5 | 50 |
| A | 10 | 10 |
| C | 2.5 | 10 |
| A + C | 10 + 2.5 | 30 |
| none | 0 | 0 |
| A | 20 | 0 |
| D | 50 | 45 |
| A + D | 20 + 50 | 80 |
| A | 10 | 0 |
| D | 50 | 45 |
| A + D | 10 + 50 | 80 |
| none | 0 | 0 |
| A | 20 | 0 |
| E | 20 | 70 |
| A + E | 20 + 20 | 100 |
| A | 20 | 0 |
| E | 10 | 65 |
| A + E | 20 + 10 | 95 |
| A | 20 | 0 |
| E | 5 | 10 |
| A + E | 20 + 5 | 70 |
| A | 10 | 0 |
| E | 20 | 70 |
| A + E | 10 + 20 | 95 |
| A | 10 | 0 |
| E | 10 | 65 |
| A + E | 10 + 10 | 90 |
| A | 10 | 0 |
| E | 5 | 10 |
| A + E | 10 + 5 | 30 |
| none | 0 | 0 |
| A | 20 | 0 |
| F | 200 | 20 |
| A + F | 20 + 200 | 90 |
| A | 20 | 0 |
| F | 150 | 20 |
| A + F | 20 + 150 | 90 |
| A | 20 | 0 |
| F | 100 | 0 |
| A + F | 20 + 100 | 4 |
| A | 10 | 0 |
| F | 200 | 20 |
| A + F | 10 + 200 | 65 |
| A | 10 | 0 |
| F | 150 | 20 |
| A + F | 10 + 150 | 70 |
| A | 10 | 0 |
| F | 100 | 0 |
| A + F | 10 + 100 | 40 |
| none | 0 | 0 |
| A | 20 | 0 |
| G | 200 | 0 |
| A + G | 20 + 200 | 90 |
| A | 20 | 0 |
| G | 150 | 0 |
| A + G | 20 + 150 | 30 |
| none | 0 | 0 |
| A | 20 | 0 |
| H | 20 | 10 |
| A + H | 20 + 20 | 100 |
| A | 20 | 0 |
| H | 10 | 0 |
| A + H | 20 + 10 | 50 |
| A | 10 | 0 |

| | | |
|---|---|---|
| H | 20 | 10 |
| A + H | 10 + 20 | 100 |
| A | 10 | 0 |
| H | 10 | 0 |
| A + H | 10 + 10 | 20 |

EXAMPLE 6

Preparation of 1,000 capsules each containing 300 mg of the active ingredients:

| Formula: | |
|---|---|
| Rifampicin | 150 g |
| Gentamycin | 150 g |
| Talcum | 36 g |
| Corn starch | 24 g |
| Magnesium stearate | 16 g |
| Lactose | 4 g |
| | 380 g |

PROCEDURE

All powders are passed through a screen with an opening of 0.6 mm and mixed thoroughly. 0.5 ml hard gelatine capsules are filled with 380 mg of said mixture, using a capsule filling machine.

EXAMPLE 7

Preparation of 1,000 capsules each containing 150 mg of the active ingredients:

| Formula: | |
|---|---|
| rifampicin | 75 g |
| kanamycin | 75 g |
| ethyl cellulose | 3 g |
| stearic acid | 3 g |
| | 156 g |

PREPARATION

The ethyl cellulose and stearic acid are dissolved in 120 ml methylene chloride, the antibiotics are added and the mass passed through a sieve with 0.6 mm openings at a temperature of about 40°, whereby the methylene chloride evaporates. 156 mg of the granulate obtained are filled into 0.5 ml hard gelatine capsules using a capsule filling machine.

EXAMPLE 8

Preparation of a poultry feed containing 0.005 percent of the active ingredients:

| Premix: | |
|---|---|
| rifampicin | 25 g |
| chlortetracycline | 25 g |
| confectioners sugar | 50 g |
| soybean feed, solvent extracted | 275 g |
| | 375 g |
| Feed Formula: | Pounds |
| Corn meal | 1103.0 |
| Soybean meal, 44% protein | 660.0 |
| Alfalfa meal | 30.0 |
| Dicalcium phosphate | 40.0 |
| Limestone meal | 10.0 |
| Salt | 5.0 |
| Fish meal, 60% protein | 40.0 |
| Stabilized fat | 60.0 |
| Dried whey | 40.0 |
| Manganese sulfate | 0.5 |
| Zinc oxide | 0.3 |
| d,1-methionine | 1.5 |
| Vitamin premix | 10.0 |
| | 2000.3 |

10 lb. of the vitamin composition contain: 16,000,000 I.U. Vit. A. 1,000,000 I.U. Vit. $D_3$, 5,000 I.U. Vit. E acetate, 6 g Vit. $K_3$, 6 mg Vit. $B_{12}$, 3 g riboflavin, 30 g niacin, 5 g calcium pantothenate and 100 g ethoxyquin, made up to 10 lb. with corn meal.

PROCEDURE

The antibiotics and sugar are mixed thoroughly, screened through a sieve with 0.6 mm openings and blended with the soybean feed. The premix is then added to the feed in such amount as to obtain said concentration and the whole is homogenized in a horizontal drum mixer.

According to the method described in Examples 6-8, capsules or feed mixtures are prepared containing equieffective amounts of the other antibiotics hereinbefore described or exemplified.

We claim:

1. An antibiotic pharmaceutical or veterinary composition, consisting of an antibiotically effective amount of 1) rifampicin, 2) oxytetracycline, or a therapeutically useful salt of either component, wherein the proportions of the rifampicin to the oxytetracycline is 1:7.5 to 1:20 and 3) a pharmaceutical excipient suitable for enteral application.

2. A composition as claimed in claim 1, wherein the pharmaceutical excipinet, and the component 3) is a pharmaceutical capsule excipient.

3. A composition as claimed in claim 1, containing between about 0.1 to 75 percent of the components 1) and 2) in the pharmaceutical excipient 3).

4. An antibiotic feedstuff or feed additive consisting of a growth promoting an amount of 1) rifampicin, 2) oxytetracycline, or a therapeutically useful salt of either component, wherein the proportions of the rifampicin to the oxytetracycline is 1:7.5 to 1:20 and 3) an extender, diluent or nutrient.

5. A feedstuff as claimed in claim 4, containing between about 0.00001 and 0.01 percent of the components 1) and 2) in a nutrient.

6. A feed additive as claimed in claim 4, containing between about 1 and 75 percent of the components 1) and 2) in an extender.

* * * * *